US006200682B1

(12) United States Patent
Dubelsten et al.

(10) Patent No.: US 6,200,682 B1
(45) Date of Patent: Mar. 13, 2001

(54) APPARATUS AND METHOD FOR CONTINUOUS FORMATION OF COMPOSITES HAVING FILLER AND THERMOACTIVE MATERIALS AND PRODUCTS MADE BY THE METHOD

(75) Inventors: Paul Dubelsten, Tualatin, OR (US); Lorence E. Knowles, Meridian, ID (US); Erik J. Van Kleek, Portland, OR (US)

(73) Assignee: Boise Cascade Corporation, Boise, ID (US)

( * ) Notice: Subject to any disclaimer, the term of this patent is extended or adjusted under 35 U.S.C. 154(b) by 0 days.

(21) Appl. No.: 08/988,680

(22) Filed: Dec. 11, 1997

Related U.S. Application Data

(60) Provisional application No. 60/032,690, filed on Dec. 11, 1996.

(51) Int. Cl.[7] .............................. B32B 21/02

(52) U.S. Cl. .............................. 428/409; 428/364; 428/532; 428/537.1; 524/34; 524/35

(58) Field of Search .............................. 428/409, 507, 428/511, 534, 364, 532, 537.1; 524/34, 35

(56) References Cited

U.S. PATENT DOCUMENTS 3,023,136 2/1962 Himmelheber et al. .
3,995,980 12/1976 Smith .

(List continued on next page.)

FOREIGN PATENT DOCUMENTS 1 453 374 1/1969 (DE) .
4009883A 10/1991 (DE) .

(List continued on next page.)

OTHER PUBLICATIONS

English–language translation of Bunzl's German Patent No. 1 453 374 No Date Provided.

(List continued on next page.)

*Primary Examiner*—David Brunsman
(74) *Attorney, Agent, or Firm*—Klarquist Sparkman Campbell Leigh & Whinston, LLP

(57) ABSTRACT

An apparatus and method for continuously forming composites comprising filler materials and thermoactive materials, particularly waste cellulosic materials and waste thermoplastics, are described. One embodiment of the apparatus includes either a batchwise or continuous mixer, such as a cyclone, for forming mixtures comprising filler and thermoactive material. The mixtures are conveyed to a continuous consolidation apparatus. Alternatively, the mixtures may be densified in a densifying apparatus before entering the consolidation apparatus. The consolidation apparatus includes a hot-gas distribution system having plural paired gas cells, such as rollers or hoods, for applying hot air to the charge. A first cell of each pair applies gas to the mixture. The second cell of each pair operates at a pressure less than that of the first cell, thereby creating a pressure differential across the charge. Certain embodiments of the apparatus include at least one set of baffles positioned adjacent a cell, at least one shroud positioned about a cell, or at least one set of baffles positioned adjacent a first cell and at least one shroud positioned about a second cell. The baffles and shrouds are used to eliminate or substantially reduce the amount of gas that is vented to the surrounding atmosphere. The method comprises continuously consolidating the mixtures by applying a hot, dry noncondensable gas to the mixture. Besides the filler material and the thermoactive material the mixture may further include materials selected from the group consisting of biocides, fungicides, fire retardants, conductive materials, pigments, water retardants, wax-like materials, coupling agents, crosslinking agents, and combinations thereof.

21 Claims, 4 Drawing Sheets

U.S. PATENT DOCUMENTS

| | | |
|---|---|---|
| 3,998,580 | 12/1976 | Pffiffer . |
| 4,094,756 | 6/1978 | Taylor . |
| 4,416,949 | 11/1983 | Gabellieri et al. . |
| 4,894,192 | 1/1990 | Warych . |
| 5,075,057 | 12/1991 | Hoedl . |
| 5,088,910 | 2/1992 | Goforth et al. . |
| 5,155,146 | 10/1992 | Reetz . |
| 5,169,580 | 12/1992 | Marcus . |
| 5,178,802 | 1/1993 | Cree et al. . |
| 5,284,546 | 2/1994 | Tilby . |
| 5,356,278 | 10/1994 | Reetz . |
| 5,391,438 | 2/1995 | Pasternak . |
| 5,417,904 | 5/1995 | Razi et al. . |
| 5,435,954 | 7/1995 | Wold . |
| 5,441,801 | 8/1995 | Deaner et al. . |
| 5,474,722 | 12/1995 | Woodhams . |
| 5,486,553 | 1/1996 | Deaner et al. . |
| 5,497,594 | 3/1996 | Giuseppe et al. . |
| 5,516,472 | 5/1996 | Laver . |
| 5,518,677 | 5/1996 | Deaner et al. . |
| 5,539,027 | 7/1996 | Deaner et al. . |
| 5,585,155 | 12/1996 | Heikkila et al. . |
| 5,759,680 | 6/1998 | Brooks et al. . |
| 5,773,138 | 6/1998 | Seethamraju et al. . |
| 5,827,607 | 10/1998 | Deaner et al. . |
| 5,872,190 | 2/1999 | Gutowski et al. . |
| 5,879,757 | 3/1999 | Gutowski et al. . |

FOREIGN PATENT DOCUMENTS

| | | |
|---|---|---|
| 0 045 216 A1 | 7/1981 | (EP) . |
| 0 267 516 A2 | 5/1988 | (EP) . |
| 0 383 572 A2 | 8/1990 | (EP) . |
| 903499 | 8/1962 | (GB) . |
| 50-757 | 1/1975 | (JP) . |
| 495213 | 12/1975 | (SU) . |
| WO 95/07808 | 3/1995 | (WO) . |
| WO 95/19995 | 7/1995 | (WO) . |
| WO 95/20006 | 7/1995 | (WO) . |
| WO 95/31318 | 11/1995 | (WO) . |

OTHER PUBLICATIONS

Youngquist et al. "Mechanical and Physical Properties of Air–Formed Wood–Fiber/Polymer–Fiber Composites," *Forest Products Journal*, vol. 42, No. 6, pp. 42–48 (1992) No Month Provided.

Lopata et al., "Electron–beam processing of wood fiber–reinforced polypropylene," Tibor Czvikovszky, Hungarian Plastics Research Institute, H–1950 Budapest, Hungary, AECL Research, Whiteshell Laboratories, Pinawa, Manitoba, Canada, pp. 68–74 No Date Provided.

Bataille, P., Ricard L. and Sapieha, S. "Effect of Cellulose Fibers in Polypropylene Composites," *Polymer Composites*, 10(2):103–108 (1989) No Month Provided.

Bataille, P., Allard, P., Cousin, P. and Sapieha, S., "Interfacial Phenomena in Cellulose/Polyethylene Composites," *Polymer Composites* 11(5);301–304 (1990) No Month Provided.

Cruz–Ramos, C.A., "Natural Fibre Reinforced Thermoplastics. In: Mechanical Properties of Reinforced Thermoplastics," D.W. Clegg and A.A. Collyer eds. Elsevier, *Applied Sci. Publ.*, London, U.K., pp. 65–81 (1986) No Month Provided.

Dalvag, H., Klason, C. and Stromvall, H.E., "The Efficiency of Cellulosic Fillers in Common Thermoplastics. Part II. Filling with Processing Aids and Coupling Agents," *Intern. J. Polymeric Mater.* 11:9–38 (1985) No Month Provided.

Klason, C., Kubat, J. and Stromvall, H.E., "The Efficiency of Cellulose Fillers in Common Thermoplastics. Part I. Filling without Processing Aids or Coupling Agents," *Intern. J. Polymeric Mater.* 10:159–187 (1984) No Month Provided.

Kokta, B.V., Raj, R.G. and Daneault, C., "Use of Wood Flour as Filler in Polypropylene: Studies on Mechanical Properties," *Polym.–Plast. Technol. Eng.* 28(3):247–259 (1989) No Month Provided.

Kokta, B.V., Maldas, D., Daneualt, C. and Beland, P., Composites of Polyvinyl Chloride–Wood Fibers. I. Effect of Isocyanate as a Bonding Agent, *Polym. Plast. Technol. Eng.* 29(1/2):87–118 (1990) No Month Provided.

Kokta, B.V., Maldas, D., Daneault, C. and Beland, P., "Composites of Poly(Vinyl Chloride) and Wood Fibers. II. Effect of Chemical Treatment," *Polymer Composites* 11(2):84–89 (1990) No Month Provided.

Maldas, D. and Kokta, B.V., "Effects of Coating Treatments on the Mechanical Behavior of Wood Fiber–Filled Polystyrene Composites, I. Use of Polyethylene and Isocyanate as Coating Components," *J. Applied Polymer Sci.* 40:917–928 (1990) No Month Provided.

Maldas, D. and Kokta, B.V., "Effect of Recycling on the Mechanical Properties of Wood Fiber–Polystyrene Composites. Part 1: Chemithermomechanical Pulp as a Reinforcing Filler," *Polymer Composites* 11(2):77–83 (1990) No Month Provided.

Raj, R.G., Kokta, B.V., Maldas, D. and Daneault, C. "Use of Wood Fibers in Thermoplastics. VII. The Effect of Coupling Agents in Polyethylene–Wood Fiber Composites," *J. Applied Polymer Sci.* 37:1089–1103 (1989) No Month Provided.

Woodhams, R.T., Thomas, G. and Rodgers, D.K., "Wood Fibers as Reinforcing Fillers for Polyolefins," *Polymer Eng. Sci.* 24(15):1166–1171 (1984) No Month Provided.

Zadorecki, P. and Michell, A.J., "Future Prospects for Wood Cellulose as Reinforcement in Organic Polymer Composites," *Polymer Composites* 10(2):69–77 (1989) No Month Provided.

Unofficial English–language translation of SU 495213 (Dec. 1975).

Hoff Forest Products literature on StranDEK Decking No Date Provided.

APPARATUS AND METHOD FOR CONTINUOUS FORMATION OF COMPOSITES HAVING FILLER AND THERMOACTIVE MATERIALS AND PRODUCTS MADE BY THE METHOD

CROSS REFERENCE TO RELATED APPLICATION

This application claims priority from now abandoned U.S. provisional patent application No. 60/032,690, filed on Dec. 11, 1996, which is incorporated herein by reference.

FIELD OF THE INVENTION

This invention concerns an apparatus and method for applying a hot, dry gas to filler and thermoactive materials, particularly cellulosic and thermoplastic materials, in the continuous production of composites.

BACKGROUND OF THE INVENTION

Products that combine wood materials with thermoplastic or thermoset materials are known. These products generally are made using batch processes, such as processes that employ heated platens to apply heat and a compression force to the substrate, instead of continuous processes.

Recently, products comprising waste plastics and waste cellulosic materials have been developed, most of which are made by extrusion or injection-die methods. Examples of patented inventions concerning wood/plastic composite products include:

(a) Smith's U.S. Pat. No. 3,995,980, which describes forming mixtures of materials using three separate delivery systems, and thereafter extruding products comprising the mixture;

(b) Goforth et al.'s U.S. Pat. No. 5,088,910, which describes an extrusion process for making synthetic wood products from recycled materials, such as low or high density polyethylene;

(c) Wold's U.S. Pat. No. 5,435,954, which discusses a method for forming wood-plastic composites comprising placing mixtures of such materials in molds and subjecting the mixture to sufficient temperatures to cause the material to occupy the mold and assume its shape; and (d) Reetz' U.S. Pat. Nos. 5,155,146 and 5,356,278, incorporated herein by reference, which describe extrusion apparatuses and processes for processing charges that include expanded thermoplastic materials, such as polystyrene.

There are several disadvantages associated with the inventions discussed above. A principal problem associated with extrusion and injection methods is that the particle size of the materials used to form the composite must be fairly small. Otherwise, the viscosity of the composite mixture is too high to be extruded or injection molded efficiently. Moreover, extrusion and injection processes are further limited by the ratio of filler materials, such as wood, to the thermoactive materials that can be used in the charge (i.e., the mixture of filler material and thermoactive material used to form the final product). This puts undesirable constraints on the products that can be produced.

Another problem associated with these prior processes and apparatuses involving heated platens is that they produce products batchwise, instead of continuously. This substantially reduces product throughput. For example, heated platens take too long to heat composites completely throughout their cross section. If the temperature of the platens is increased too much in an effort to speed production, the composite product may burn or scorch, particularly at temperatures above about 400° F. Moreover, many processes that use platen presses require that the platen not only be heated but also cooled during each production cycle. This decreases product throughput and is expensive in view of the energy required to complete the serial heating and cooling steps.

Steam injection processes also can be used to produce composites. However, the initial steam heating stage is followed by continued heating to remove all of the water applied to the composite during the steam injection process. The combination of heating the composite to form products, followed by continued heating to remove water, requires a longer period of time and is more expensive than is desirable in a commercial process. German Patent No. 14 53 374 (the '374 patent) describes a continuous process for forming composites comprising waste plastic and waste wood. A mixture of waste plastic and waste wood is pressed in the nip between two rollers and hot air is applied to the substrate as it travels around the rollers. The structural features of the apparatus described in the '374 patent are limiting. For example, the '374 patent teaches applying hot gas to only one of the two major opposed surfaces of a substrate at a time. As the substrate passes over one roller gas is applied to one surface; then as the substrate passes over a second roller, hot gas is applied to the opposite surface. There is considerable energy loss, and therefore added expense, as a result of heated gas being vented to the atmosphere after passing through the composite. This also may present a health problem in that vented gas may include volatile organic compounds (VOCs) that present a health risk.

Despite the inventions discussed above, there still is a need for an effective and efficient apparatus and method for continuously forming composite products.

SUMMARY OF THE INVENTION

The present invention overcomes the difficulties of the prior art by providing an effective and efficient composite consolidation apparatus and method for continuously forming composite products comprising filler materials and thermoactive materials. The apparatus and method are particularly suited for forming composites comprising waste cellulosic materials and waste thermoplastics.

One embodiment of the consolidation apparatus includes a hot-gas distribution system having at least one pair of gas cells, more typically plural paired gas cells, such as rollers or hoods, for applying hot air to the charge. A first cell of each pair applies gas to the charge, and generally is referred to as an application roller. The second cell of each pair, referred to as a suction roller, operates at a pressure less than the application roller, i.e., a pressure differential exists between the application roller and the suction roller. Certain embodiments of the apparatus include at least one set of baffles positioned adjacent a cell, at least one shroud positioned about a cell, or at least one set of baffles positioned adjacent a first cell and at least one shroud positioned about a second cell to eliminate or substantially reduce the amount of gas that is vented to the surrounding atmosphere.

The consolidation apparatus can be used in combination with other apparatuses to form a system. One embodiment of the system comprises: (1) a mixer, such as a cyclone, for continuous or batchwise formation of mixtures of filler material and thermoactive material; (2) optionally a prepress for optional densification of the mixture prior to subsequent treatment; (3) a consolidation apparatus having a thermal consolidation zone, and perhaps a densifying zone, for continuously applying hot-gas to a moving charge, the zone having at least one pair of and perhaps plural paired gas cells wherein a first cell of each pair applies gas to the moving charge and wherein a second cell of each pair operates at a pressure less than in the first cell; and (4) a mechanical densifying apparatus for applying a densifying pressure to the charge downstream of the consolidation zone. The system may further include a mat-forming apparatus downstream of the mixer and upstream of the consolidation zone.

The invention further comprises a method for continuously forming composites. A mixture is formed comprising a waste thermoactive material and a waste filler material. The mixture is then continuously consolidated by applying a hot, dry noncondensable gas to the mixture. The apparatus described above may be used to continuously apply the gas to the mixture, and the mixture may move continuously through a zone where the consolidating gas is applied. Generally, but not necessarily, the filler material comprises cellulosic material, and the thermoactive material is a thermoplastic material. The mixture may further include materials selected from the group consisting of biocides, fungicides, fire retardants, conductive materials, pigments, water retardants, wax-like materials, coupling agents, crosslinking agents, and combinations thereof.

DETAILED DESCRIPTION OF THE PREFERRED EMBODIMENTS

Figure 1:
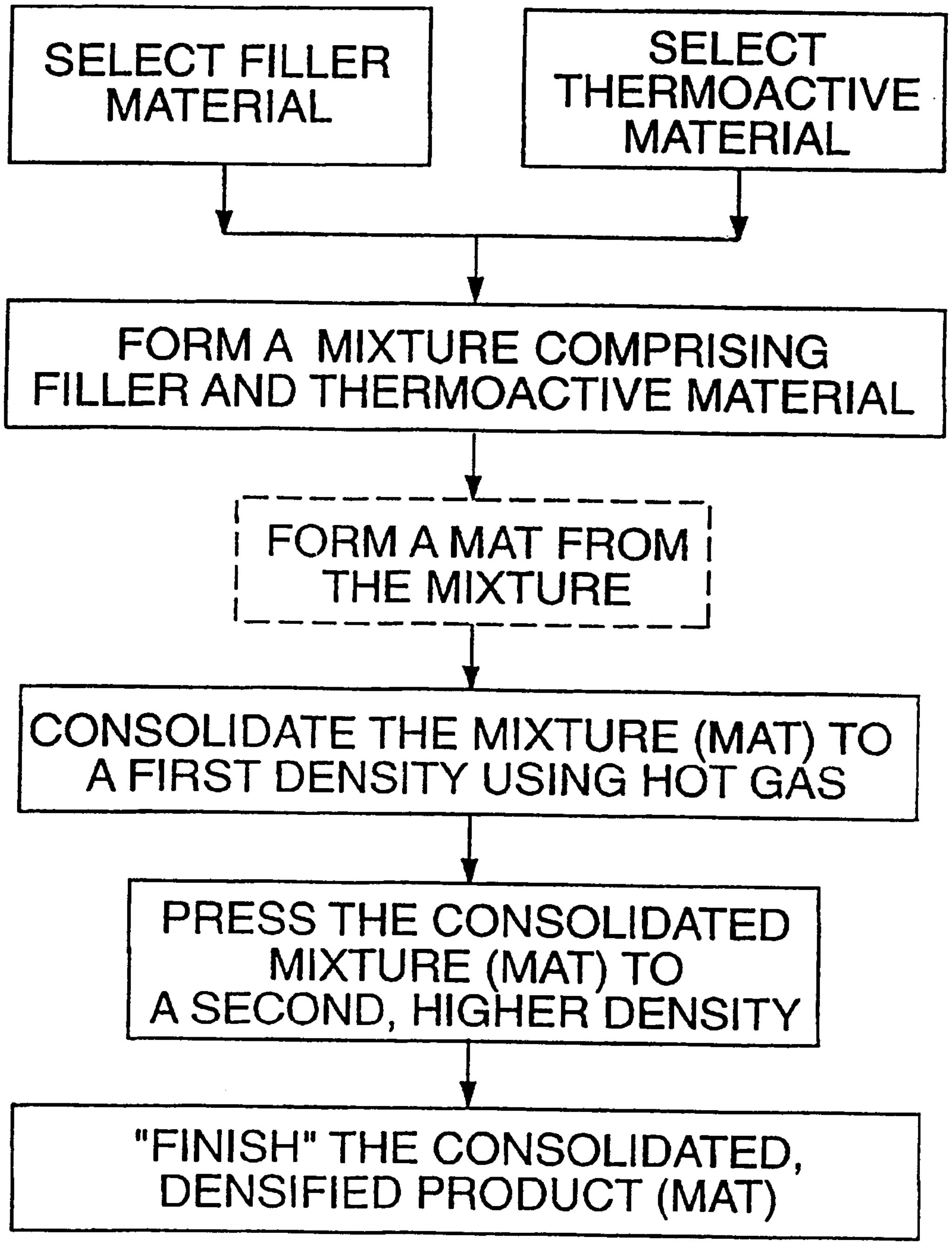
FIG. 1 is a flow chart illustrating certain process steps used to form composites that include filler materials and thermoactive materials in accordance with the invention.

The flow chart of FIG. 1 illustrates certain process steps used to form composite products that include filler materials and thermoactive materials. The first steps in the process require selecting appropriate filler material, selecting appropriate thermoactive material, and thereafter forming a mixture comprising such materials. The mixture may be used as a charge for the continuous consolidation apparatuses illustrated in FIGS. 3–6. Alternatively, the mixture may be processed before being consolidated by the apparatuses of FIGS. 3–6, such as by using a preliminary preheating and/or pressing stages to provide an intermediate substrate. One example of an intermediate substrate suitable as a charge for the illustrated continuous consolidation apparatuses is a mat of the composite material. Mats can be formed using conventional apparatuses known in the art.

The apparatuses illustrated in FIGS. 3–6 continuously consolidate charges in a consolidation stage by applying hot gas thereto using the illustrated hot-gas distribution systems. As used herein, "consolidates" or "consolidation," means that the mixture of filler and thermoactive material is processed from a first initial density to a second, greater density of from about 5 pounds per cubic foot (pcf) to about 50 pcf, and more typically from about 5 pcf to about 12 pcf. The second, greater density results, for example, as the thickness dimension of the charge decrease upon application of the hot gas (i.e., thermal consolidation), and perhaps a simultaneous densifying force (mechanical consolidation), thereto. It also should be appreciated that the density of the charge may be serially increased by thermal and/or mechanical consolidation as the charge moves through the consolidation zone.

Figure 3:
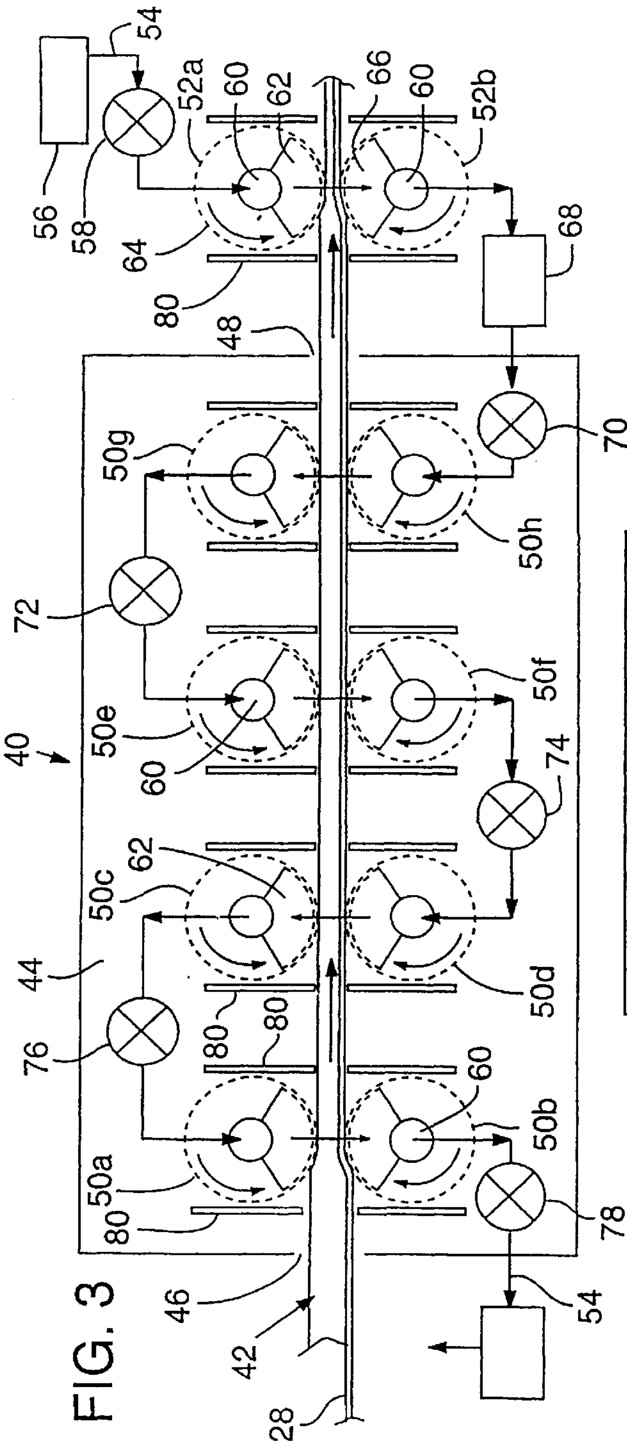
FIG. 3 is a schematic, longitudinal sectional view of an embodiment of a continuous consolidation and densifying apparatus in accordance with the invention.

As indicated by FIG. 1, the consolidated product may then be further compressed to an even greater density in a densifying stage, such as by using a conventional press. However, the apparatuses of FIGS. 3–5 may be designed to both compress the charge and consolidate the charge to a greater density than could be achieved by hot gas consolidation alone. And, each pair of cells forming the apparatus may increase the force applied to the charge moving through a consolidation zone. Alternatively, the apparatuses may include (1) a first consolidation stage wherein the density of the charge generally increases by application of the hot gas, and (2) a second densifying stage wherein greater compression forces, and perhaps cooler temperatures than in the heating stage, are applied to the composite product to achieve the product's final desired density, as shown in FIG. 3.

The preferred materials, without limitation, for preparing the composite products comprise waste cellulosic materials and waste thermoactive materials, such as waste plastics. Each of these materials is described below, followed by a discussion of the apparatuses illustrated in the drawings.

I. MATERIALS FOR FORMING COMPOSITES

A. Filler Materials

Without limitation, a partial list of filler materials includes all natural and synthetic fibers, examples of which include cellulosic materials, carbon-based materials such as carbon fibers, glass fibers, and mixtures of these materials. A currently preferred filler material is cellulosic material.

The cellulosic material may be virgin wood materials, i.e., materials that have not been used previously to form products, such as wood chips, sawdust, cotton, hemp, straw, or combinations of such materials. Alternatively, the cellulosic material may comprise waste products, such as used paper, peanut shells, used cotton, used railroad ties, fibers derived from paper mill sludge, fibers derived from recycling mill sludge, and combinations of such materials. Moreover, the cellulosic material may comprise virgin materials mixed with waste materials.

Single-layer products made in accordance with the present invention typically include both cellulosic materials and plastic materials where the average particle size that ranges anywhere from about 3/16 inch in length to about 3/4 inch in length. The strength of the product may be affected by the size of the particles used to form the board product, but cellulosic and plastic materials having particle sizes that range anywhere from about 3/16 inch in length to about 3/4 inch in length have been found suitable for making single-layer products, or the core portion of multilayered board products. Multilayered products made in accordance with the present invention often have one or more layers that include "fines", i.e., materials having an average particle size of less than about 3/16 inch, and more typically having a particle size so that approximately 80% of the particles pass through a 14 mesh size screen.

B. Thermoactive Materials

The filler material is mixed with a thermoactive material. “Thermoactive” refers to both thermoset and thermoplastic materials. Thermoplastic materials generally are preferred materials because waste thermoplastics can be remelted, allowing the melted thermoplastic material to wick along and to flow around the filler materials. The thermoactive materials act as binders for the filler particles once the thermoactive materials are heated to a temperature sufficient to make them flow, in the case of thermoplastics, or heated to the cure temperature in the case of thermoset materials.

As with the filler material, the thermoactive material may be any material now known or hereafter discovered that is useful for forming composite products. Moreover, the thermoactive material may be virgin, i.e., materials that have not been used previously for any purpose. Alternatively, the thermoactive material can be a waste material, particularly waste thermoplastic materials.

Examples of suitable thermoactive materials include, but are not limited to: polyamides and copolymers thereof; polyolefins and copolymers of polyolefins, with particular polyolefin examples including polyethylene, polypropylene, polybutene, polyvinyl chloride, acrylate derivatives, acetate derivatives, etc; polystyrene and copolymers of polystyrene; polycarbonates; polysulfones; polyesters; polyvinyl chloride; polyvinylidene chloride; copolymers of vinyl chloride and vinylidene chloride; and mixtures of these materials.

This list should not be considered an exhaustive list of thermoactive materials that can be used to form composites. Any readily available, relatively nontoxic thermoactive material which (1) can be made to flow to coat filler fibers or particles, or which can be heated to a curing temperature, and (2) which materials act as suitable binders for the fibrous material, can be used.

C. Additional Materials

The composites that are produced according to the present invention are not limited to having only filler materials and thermoactive materials. A partial list of additional materials that can be used to form such composites includes preservatives, biocides, fungicides, fire retardants, conductive materials such as carbon black, pigments, water retardants, wax-like materials, coupling agents (which are used to enhance the interaction between the filler material and the thermoactive material), crosslinking agents, and combinations thereof.

Crosslinking agents have been found to decrease the creep observed with composite products made in accordance with the present invention. “Crosslinking” refers to reactions that occur with thermoactive materials, either intermolecularly or intramolecularly, most typically intramolecularly, and is distinguished from coupling agents which form bonds between thermoactive materials and the cellulose. See the examples provided below for more detail concerning crosslinkng the thermoactive materials and creep. A number of crosslinking agents can be used to practice the method of the present invention. For example and without limitation, suitable crosslinking agents can be selected from the group consisting of organic peroxides, such as dicumyl peroxide, t-butyl peroxide, benzoyl or dibenzoyl peroxide, t-butyl peroxybenzoate, butyl 4,4-di-(t-butylperoxy)valerate, t-butyl cumyl peroxide, di-(2-t-butylperoxyisopropyl) benzene, di2,4-dichlorobenzoylperoxide, 1,1-di-(t-butylperoxy)-3,3,5-trimethylcyclohexane, 2,5-dimethyl-2,5-di(t-butylperoxy)hexane, 2,5-dimethyl2,5-di(t-butylperoxy) hexyne, azonitriles, such as 2,2'-azobisisobutyronitrile, azo-type derivatives, such as 2,2-azoisobutene and triazobenzene, and other free-radical generators, such as benzenesulfonyl azide and 1,4-dimethyl-1,4-diphenyltetrazene, and any combination of these crosslinking agents. Particularly suitable crosslinking agents are selected from the group consisting of dicumyl peroxide, t-butyl peroxide, benzoyl or dibenzoyl peroxide, t-butyl peroxybenzoate, and combinations thereof, with dicumyl peroxide being a currently preferred crosslinking agent for use in making cellulose/thermoactive composites according to method of the present invention.

Generally, the crosslinking agents are mixed with the thermoactive component or components prior to forming mixtures comprising the thermoactive component/crosslinking materials and cellulose. This can be accomplished in a batch process by forming a solution, typically an organic solution, comprising a crosslinking agent or agents, and then applying the solution to the thermoactive material. Alternatively, the thermoactive material may be immersed in the solution comprising the crosslinking agent. In a continuous commercial process, the crosslinking agent likely will be applied to the therinoactive material by atomizing liquid crosslinking agent, or a solution comprising the crosslinking agent, and spraying the atomized material onto the thermoactive material.

II. MIXING FILLER AND THERMOACTIVE MATERIALS

Once the desired materials are selected as described above, the materials are then combined to form a mixture. The materials may be mixed by hand or by using a hand actuated mixer. However, for commercial production it is preferred to mix the materials using a large-capacity, continuous or batch blending apparatus that tumbles, oscillates, shakes, or otherwise thoroughly mixes the materials. Such apparatuses are referred to herein as mixers.

Figure 2:
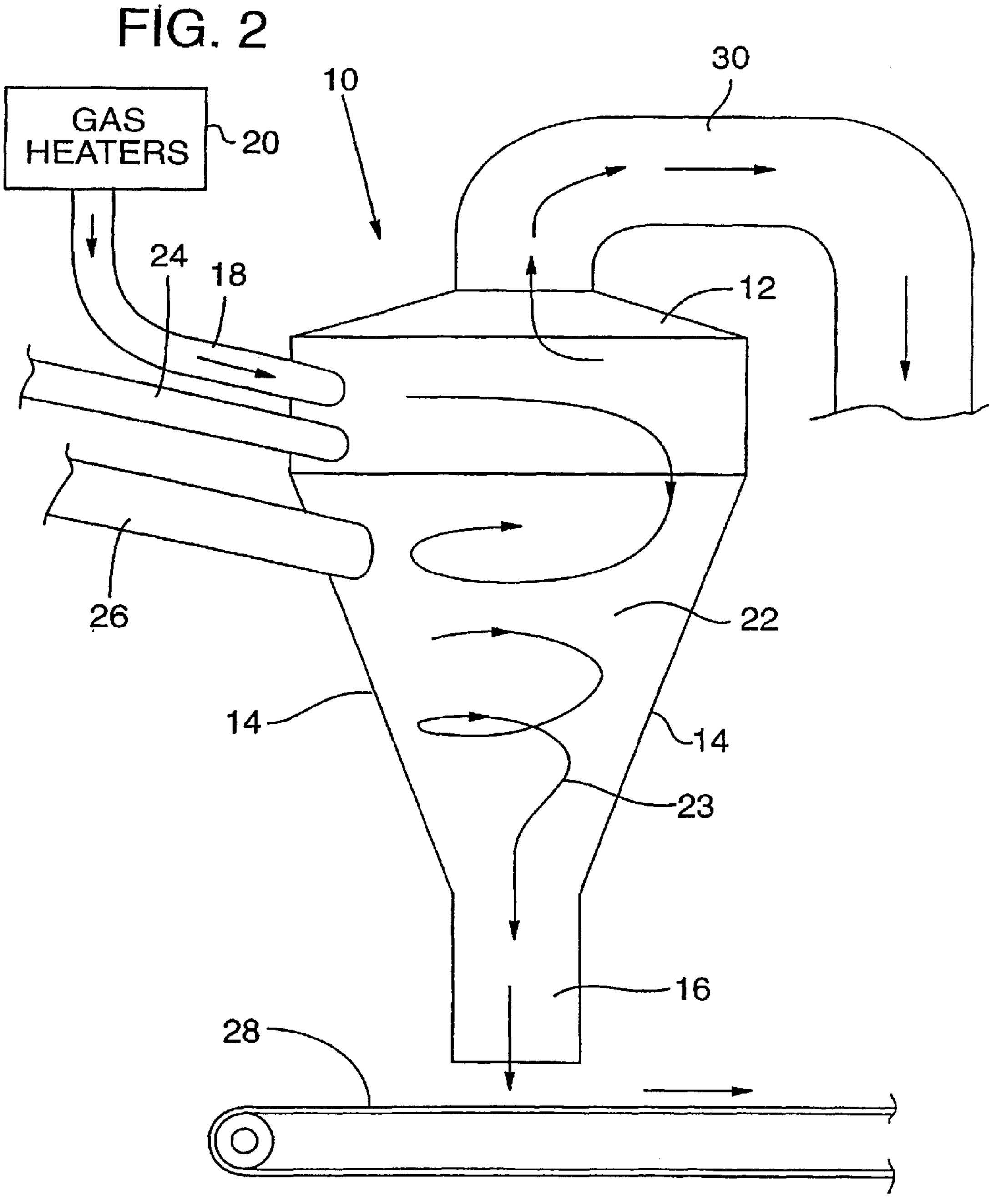
FIG. 2 is a schematic, side elevational view illustrating a cyclone mixer for mixing filler and thermoactive material in accordance with the invention.

The filler material and the thermoactive material may be mixed using a cyclone mixing and/or heating apparatus 10 illustrated in FIG. 2. Cyclone 10 also can be used solely as a heating chamber for preheating a previously formed mixture of filler material and thermoactive material prior to the mixture being consolidated in one of the apparatuses of FIGS. 3–6. Cyclone 10 includes a top 12, walls 14, and a bottom outlet 16. Cyclone 10 also includes a gas supply conduit 18 which passes through wall 14. Gas conduit 18 is coupled to a gas heater 20 and conveys hot, pressurized gas from a gas source (not illustrated) to interior region or chamber 22 adjacent top 12 of cyclone 10. The heater heats the gas to a temperature of from about 250° F. to about 600° F. Gas conduit 18 is coupled to wall 14 so as to substantially prevent the hot gas from being vented to the atmosphere.

Cyclone 10 also includes at least one additional supply conduit 24 that passes through wall 14 and into the interior region 22. If the cyclone 10 is used solely to preheat the filler material and thermoactive material, then the conduit 24 transports a preformed mixture of these materials to the interior 22 of the cyclone 10. Alternatively, if cyclone 10 is being used as both a mixing and heating chamber, then the cyclone 10 may include a third supply conduit 26. One of the conduits 24 and 26 transports comminuted filler material from a filler material storage unit (not illustrated) to interior region 22. The other of the conduits 24 or 26 transports comminuted thermoactive material from a thermoactive material storage unit (also not illustrated) to interior region 22.

The cyclone 10 is capable of performing several functions, including forming mixtures, heating premixes of suitable mixtures, and simultaneously heating and forming mixtures. The mixing and/or heating functions occur in interior chamber 22. Filler material and thermoactive material naturally descend in a cyclonic flow path 23 towards, and eventually through, outlet 16 and onto a conveyor 28. Conveyor 28 conveys the filler-thermoactive material composition to the consolidation apparatuses illustrated in FIGS. 3–6.

From the foregoing, it will be apparent that cyclone 10, when continuously supplied with filler and thermoactive materials, either separately or in a premix, provides a continuous mixer, and perhaps heater, for the materials. As a result, a mixture or hot mixture may be supplied in a continuous stream, or charge, to the conveyor 28.

FIG. 2 also shows that cyclone 10 may include a hot gas exhaust and recycling conduit 30. This conduit is used to recycle gas from the interior region 22 back to gas heater 20. Alternatively, recycling conduit 30 may be used to supply hot gas to the hot gas distribution systems illustrated in FIGS. 3–6.

Plural cyclones similar to cyclone 10 also may be used. For example, two or more cyclones 10 can be arranged adjacent each other to deliver mixtures onto a conveyor to positions adjacent each other across the width of a conveyor. This arrangement of plural cyclones 10 can be used to form mats and other charges.

Once formed and deposited on conveyor 28, the mixture should be sufficiently permeable to a hot, dry noncondensable gas (discussed in more detail below) so as to allow the hot gas to circulate throughout the composite. The gas circulation can be affected by the ratio of the filler material to the thermoactive material. This ratio is best determined by reference to the attributes desired in the final product. In general, mixtures comprising a 7:3 ratio, by volume, of filler-to-thermoactive materials to 3:7 ratio, by volume, of filler-to-thermoactive materials can be used. Working embodiments of the invention have made mixtures comprising roughly a 1:1 ratio, by volume, of filler particles and thermoactive materials, and currently it is believed that the best results are obtained when the filler materials comprise about 60 volume percent or less of the mixture.

The filler particles and plastic particles may be of different sizes and shapes; however, it has been found that the best results, in terms of obtaining a thoroughly mixed material, are obtained when the filler particles or fibers and the plastic particles or fibers are of roughly the same size and shape. Moreover, the larger the particle size, the more time it takes to melt solid thermoactive materials, and the less thoroughly covered are the filler materials by the thermoactive materials. Thus, powdered filler material and thermoactive materials may be used. The particles also generally are mixed at ambient temperatures and under relatively dry conditions, i.e., no added water is used during the formation of the mixture. Additional materials, as discussed above, may be mixed with the filler and thermoactive materials in the mixer.

III. CONTINUOUS CONSOLIDATION

A. Background

One primary advantage of the present invention is that it allows for the continuous, thermal consolidation, and if desired, mechanical densification, of mixtures continuously supplied as described above. Steam can be used to form the composites by thermal consolidation. However, dry, noncondensable gases, particularly air, are best used for the hot-gas consolidation process. "Dry" refers to a gas in which water is not a major component, although "dry" does include materials that have some water or water vapor. For example, air generally includes some water, the amount depending upon the location. "Dry" does not include gases wherein a major fraction is water, and preferably does not include materials wherein the amount of water exceeds the saturation point of the gas at room temperature.

"Noncondensable" refers to materials that remain in a gaseous state at ambient conditions. One benefit of using a noncondensable gas is that the pressure and temperature of the gas can be independently controlled. This generally is not true for condensable gases, such as steam. When steam is used as the medium for applying heat to the composite, relatively high pressures must be used in order to maintain the gas at the desired temperature.

There a number of gases that satisfy the stated criteria for a dry, noncondensable gas. Such gases include, without limitation, air, nitrogen, carbon dioxide, and combinations of these and other gases.

The temperature of the gas also is an important consideration. For thermoactive materials, the temperature generally must be high enough to "activate" the material. With reference to thermoplastic materials, this generally means that the temperature is sufficiently high to allow the thermoplastic material to become more flowable, i.e., less viscous in nature, so that the material can flow over and around the filler materials. For thermoset materials, there generally is no precise temperature at which the material cures. Generally, the cure rate for thermoset materials depends upon the temperature, i.e., there is a direct correlation between temperature and cure rate.

Some guidance can be provided for selecting an appropriate activation temperature for a given thermoplastic or thermoset material. However, it also should be appreciated that the precise activation temperature depends on a number of factors. A partial list of such factors would include the particular materials being used to form the composite, the thickness of the composite, the ability of the materials forming the composite to absorb heat, and the heat capacity or insulating properties associated with the apparatus used to thermally consolidate, and perhaps mechanically densify, the composite while being heated or heated and densified.

Thermoplastic materials generally have an activation temperature in the range of from about 250° F. to about 600° F., and more typically from about 400° F. to about 600° F. For thermoset materials, curing may begin at temperatures of as low as about 100° F., although higher temperatures also may be used. The cure rate of thermoset materials also may be enhanced, and the curing temperature lowered, by using catalysts.

B. Consolidation System

FIG. 3 illustrates an apparatus 40 for thermally consolidating and, if desired, mechanically densifying, a filler-thermoactive material charge. Gas-permeable conveyor 28 delivers to apparatus 40 continuously a charge 42 comprising a mixture of thermoactive material and filler, as supplied, for example, from cyclone 10. Charge 42 may be a lose mixture of thermoactive material and filler, known in the art as a fluff, or may be in the form of a partially consolidated mat formed in a pre-consolidation step, which is not shown.

Charge 42 is moved into an enclosed consolidation and heating zone 44 by conveyor 28 through inlet 46. Zone 44 substantially reduces or prevents exposure of people adjacent the apparatus to volatile organic compounds (VOCs) by acting as a containment hood to remove fumes, fines and VOCs that may be emitted during the consolidation process. The enclosed consolidation zone also helps minimize heat loss from the hot gas to the surroundings.

Consolidation zone 44 houses a plurality of hot-air distribution cells, one embodiment of which comprises perforated or otherwise gas-permeable rollers 50*a*–50*h* arranged in pairs on opposite sides of a charge 42, for applying hot gas to and drawing hot gas at least partially into and perhaps through charge 42. The actual number of rollers 50 used in a particular embodiment is not critical, and is more likely defined by processing times, production rate, nature and size of the filler and thermoactive materials, and characteristics desired in the final product. FIG. 3 illustrates eight rollers 50*a*–50*h* arranged in pairs to engage the major opposed surfaces of charge 42. For example, roller 50*a* is paired with roller 50*b*.

Apparatus 40 also includes at least one additional paired set of rollers 52*a*, 52*b* located in a region exterior to zone 44 in a densifying stage of the apparatus downstream from the described consolidation stage. In the illustrated embodiment, hot-gas distribution rollers 50*a*–50*h* consolidate charge 42 from a first density, i.e., the density of charge 42 prior to entering zone 44, to a second density. This is illustrated in FIG. 3 as a decrease in the thickness of charge 42 from a first thickness to a second thickness in zone 44. Rollers 52*a*, 52*b* apply positive pressure to the charge 42 to densify the charge from the second density and thickness to a third density and a thickness. The third density and thickness may be those of the final product, or there may be an additional densifying stage (not illustrated) subsequent to the densification stage represented by rollers 52*a*, 52*b*.

Apparatus 40 includes a hot gas distribution system for applying hot gas to, and into, charge 42. The flow of gas through the system can be either counter to the direction the charge 42 moves, or it can be in the same direction the mat moves through the apparatus. Currently, the preferred flow of gas through the system is indicated by arrows 54, which show that the hot gas flows in a direction counter to the movement of charge 42 through apparatus 40. Hot pressurized gas from source 56 flows through checkpoint 58 in the direction of arrow 54. Gas checkpoint 58 may include both pressure and temperature sensors to monitor the pressure and temperature of the gas as it flows through checkpoint 58 and into first densifying roller drum 52*a*.

Each pair of rollers is coupled so that one is a hot gas application roller and the other of the pair is a suction or evacuation (if a vacuum pump is used) roller. In other words, a pressure differential is created across the pair of rollers. The gas application roller applies gas to one major surface of the charge 42 while the evacuated roller helps draw gas through the charge 42 and into the evacuated roller. For example, with the arrow 54 indicating flow direction, roller 52*a* operates as a hot gas application roller and roller 52*b* operates as an evacuated roller, thus creating a pressure differential across the charge to help the hot gas penetrate the charge and thus perform its consolidation function.

Each roller 50*a*–50*h* and 52*a*, 52*b* is substantially identical and includes a stationary central region 60 for receiving hot gas from or directing the gas to charge 42, depending upon the function of the roller as either an application or suction or evacuation roller. As an application roller, hot gas feeds into roller 52*a* by a hot gas conduit (not illustrated) and into central portion 60. Central portion 60 is fluidly coupled to a hot-gas distribution region 62 which rotates on central portion 60. External surface portion 64 of the roller is perforate, or is otherwise rendered gas permeable, so as to allow hot gas to flow from hot-gas distribution region 62 through surface 64 and into the charge under a pressure greater, but perhaps only slightly greater, than ambient. In the case of a suction or evacuation roller, gas flow is in the opposite direction, and central portion 60 is maintained under a negative pressure through connection to a suction fan or vacuum pump (not shown).

The rotation of the rollers 50*a*–50*h* and 52*a* , 52*b* is synchronized. As a result, hot gas application region 62 of roller 52*a* allows hot gas to flow to charge 42 and hot gas evacuation region 66 of roller 52*b* receives gas after it flows through charge 42. In this manner, the application of hot gas to charge 42 through roller 52*a* is coupled to the gas drawing capability of roller 52*b*. Alternatively, the rollers may include an internal, stationary baffle (not shown) that allows hot air to be expelled through perforate rollers.

Gas exiting from roller 52*b* is routed into zone 44 as indicated by the gas flow arrow 54. Prior to entering zone 44, hot gas may flow through sensor 68, which may include a temperature sensor, a pressure sensor, or both a pressure and a temperature sensor. The temperature and pressure of the hot gas can be continuously monitored at sensor 68 prior to the introduction of the hot gas through a second gas checkpoint 70. Gas checkpoint 70 houses a compressor and heater (not illustrated) to (1) increase or decrease the gas flow rate, (2) increase or decrease the gas temperature or (3) increase the temperature and decrease the flow rate, or (4) increase the flow rate and decrease the temperature, or (5) increase or decrease both the temperature and pressure of the gas as it enters rollers 50*h*. Alternatively, a charge sensor (not shown) can be positioned between pairs of rollers to directly measure the temperature of the charge. The sensor could provide temperature information to pairs of cells so that the temperature, and perhaps flow rate of air through each pair of cells, can be adjusted.

Whereas roller 52*b* is an evacuated roller in the illustrated embodiment, roller 50*h* is a gas application roller. Roller 50*g*, the roller coupled to roller 50*h*, is an evacuation roller. Thus, the arrangement of rollers 50*g* and 50*h*, with respect to the application of hot air to the opposed major surfaces of charge 42, is opposite the combination of rollers 52*a* and 52*b*. In this manner, the application of hot air can be "pulsed" or "reversed" relative to a particular point on the moving charge, i.e., hot gas is applied to one major surface of charge 42 at a first position along apparatus 40 and the charge 42 and to the second major surface of charge 42 at a second position along apparatus 40 and the charge 42. This arrangement currently is believed to ensure sufficient hot gas penetration through the cross section of charge 42 to melt or cure the thermoactive material throughout the entire cross section, and to equalize the temperature gradient throughout the cross section of the charge 42.

Air passing through charge 42 and into evacuation roller 50*g* then feeds through a third gas checkpoint 72 prior to flowing through roller 50*e*. Again, at gas checkpoint 72, the pressure and temperature of the gas can be monitored to determine whether either of these variables must be adjusted. Gas flowing from checkpoint 72 then enters gas application roller 50*e*, which is coupled to a evacuated roller 50*f*. The gas drawn through charge 42 by roller 50*f* is then fed through a third gas checkpoint 74. Gas flows through the remaining rollers 50*a*–50*d* and through a final checkpoint 78 prior to either being (1) vented to the atmosphere, or (2) recycled into an upstream portion of the gas distribution system.

FIG. 3 also illustrates that apparatus 40 may include baffles 80. Baffles 80 generally are arranged adjacent each of the gas rollers 50*a*–50*h* and 52*a*, 52*b*. Baffles 80 are positioned to help prevent loss of gas as it enters or exits through surface 64 of each of the rollers 50*a*–50*h*, and 52*a*, 52*b*.

Figure 4:
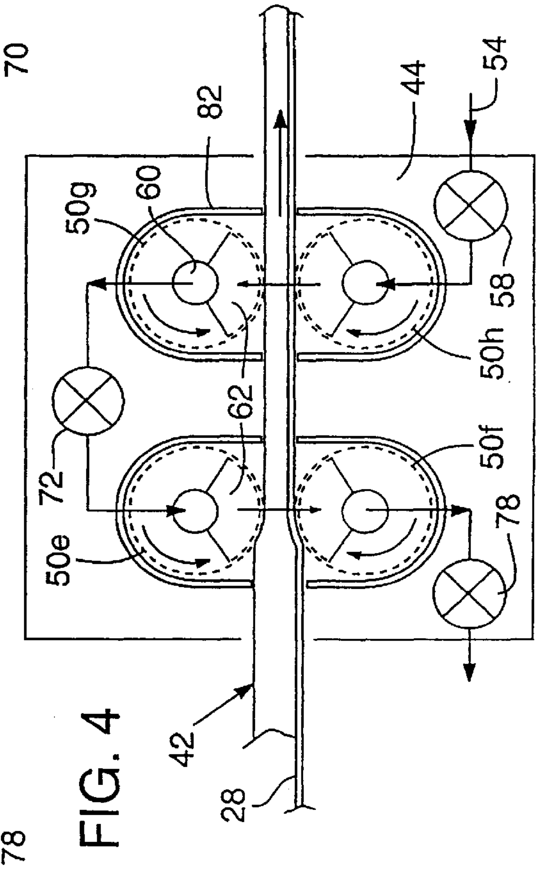
FIG. 4 is a partial schematic longitudinal sectional view showing a portion of a continuous consolidation apparatus in accordance with a second embodiment of the invention.

FIG. 4 illustrates an alternative embodiment of a baffle system that may be used instead of or in combination with the rollers 50*a*–50*h* and 52*a*, 52*b*. The embodiment illustrated in FIG. 4 shows only four rollers being housed in consolidation zone 44. It will be understood that the number of rollers in either of the embodiments of FIGS. 3 and 4 may vary. The purpose of shrouds 82 is the same as that of baffles 80, i.e., to prevent or reduce the amount of gas escaping from the system as the gas is applied to the charge 42. FIG. 4 illustrates that each of the rollers includes a shroud 82 designed to substantially completely encase the roller therein. It also is possible to use a combination of baffles 80 and shrouds 82.

Figure 5:
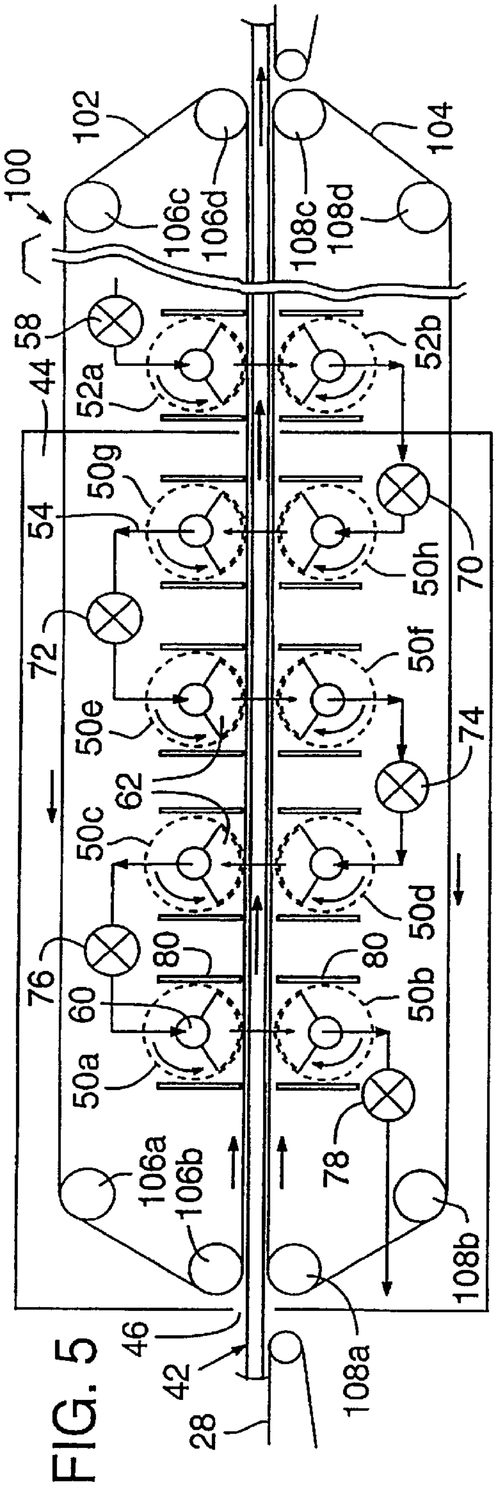
FIG. 5 is a schematic longitudinal sectional view showing a third embodiment of a continuous consolidation apparatus in accordance with the invention, including a continuous foraminous conveying belt.

FIG. 5 illustrates still another embodiment of a continuous consolidation apparatus 100. Again, the number of rollers illustrated may vary according to the particular application desired. Furthermore, structures illustrated in FIG. 5 that are similar to those illustrated in FIGS. 3 or 4 will be identified by like reference numbers.

A primary feature illustrated in FIG. 5 is the use of continuous foraminous belts 102, 104. Foraminous belt 102 is trained around belt feed rollers 106*a*–106*d*. Continuous foraminous belt 104 is trained around belt feed rollers 108*a*–108*d*. The foraminous belts 102 and 104 are positioned between charge 42 and the rollers 50*a*–50*h* and 52*a*,52*b*. Belts 102 and 104 have two primary functions. First, these belts act as conveyors to convey charge 42 through zone 44. Second, belts 102 and 104 eliminate or reduce the introduction of fines from charge 42 into the components of apparatus 100.

Figure 6:
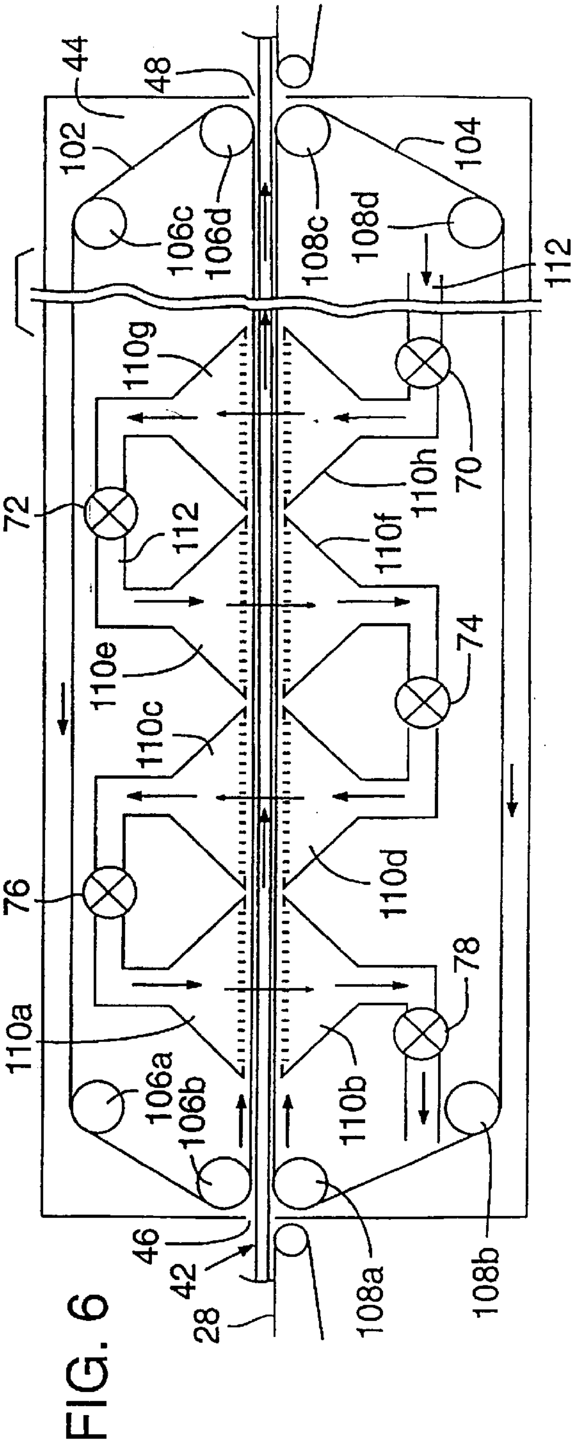
FIG. 6 is a schematic longitudinal sectional view showing a fourth embodiment of a continuous consolidation apparatus in accordance with the invention having plural hoods for applying hot gas to a charge and removing the gas after it passes through the charge.

FIG. 6 illustrates still another alternative embodiment of a gas distribution system for applying a hot gas to a charge 42 in zone 44. Again, like reference numbers will be used to designate structures in FIG. 6 that are similar to those illustrated in FIGS. 3–5.

A primary feature illustrated in FIG. 6 is the use of an alternative gas distribution system for distributing hot gas to charge 42. With reference to FIGS. 3–5, the hot-gas distribution system comprises a series of coupled rollers for both applying gas to and drawing gas through charge 42. FIG. 6 illustrates paired gas distribution hoods 110*a*–110*h* being arranged in paired fashion on opposite sides of charge 42. Hot-gas distribution conduit 112 feeds hot gas through gas checkpoint 70 and into hood 100*h*. Hood 110*h* therefore is an application hood. Hood 110*g* is an evacuated hood for drawing hot gas through charge 42. As with the previous embodiment, hot gas flowing through the charge 42 is then fed through a gas checkpoint 72 and thereafter through conduit 112 into hood 110*e*. As a result, hood 110*e* is a gas application hood, whereas coupled hood 110*f* is an evacuated hood for drawing hot gas through the charge 42.

IV. OPERATION

The operation of the apparatus will now be described with reference to using thermoplastics as the thermoactive material. The filler material and the thermoplastic material are comminuted, shredded or otherwise reduced to sizes suitable for producing composites. A room-temperature or preheated mixture of the filler material and thermoactive material is formed, such as by using cyclone or cyclones 10. The mixture is then deposited onto conveyor belt 28 as a charge, which leads to the consolidation apparatuses.

The exact pressure to which the gas is pressurized before application to charge 42 in zone 44 depends on a number of factors, such as the materials being used, the speed at which the production line operates, the flow rate, the size of the particles used to form the composite, the thickness of the composite, etc. In general, the pressure of the hot gas as applied to the charge 42 ranges from about 1 psi to about 50 psi. Surprisingly, it has been determined that the melting of thermoactive material does not prevent hot air from passing through the mat. As a result, the pressure of the gas generally varies from slightly above atmospheric, such as about 0.01 psig to at least about 10 psig above atmospheric pressure, with about 0.01 to about 2 psig being typical, and about 1 psig or less being preferred.

As hot gas is applied to composite 42, the volume of the composite decreases if the thermoactive material is a thermoplastic. This is because the thermoplastic material melts and apparently wicks along and flows around the filler material. The mixture thereafter appears to collapse under its own weight to occupy less volume than the mixture comprising solid thermoplastic material, which is referred to herein as thermal consolidation. This is particularly true if thermoplastics are used as the thermoactive material because such materials melt upon application of hot gas. The consolidation apparatuses of FIGS. 3–6 may be designed solely to thermally consolidate (as opposed to a densifying) charge 42, and therefore not compress the composite 42 to a final product density, if the cells do not exert a compression force on the charge. Alternatively, the consolidation apparatuses may exert a compression force to the composite 42. The force applied by the final press typically ranges from about 100 psi to about 1,000 psi, with about 500 psi being typical.

Once the charge 42 exits outlet 48, it may be further processed to provide an aesthetically pleasing commercial product. For example, charge 42 may be (1) sanded to provide a smooth surface, (2) embossed with desired patterns, (3) coated with an exterior coating so as to provide a water-impermeable exterior, (4) covered with a paper-based exterior coating as is known in the art of oriented strand board, (5) laminated with veneer facings, (6) painted, or (7) any combination of 1–6.

Certain of the thermoactive/cellulosic composites made in accordance with the present invention have been surface modified in order to be painted or otherwise surface decorated. Methods for modifying certain thermoactive materials are disclosed in AU 9514510 and 9515286, U.S. Pat. Nos. 5,879,757 and 5,872,190, which are incorporated herein by reference. These methods apparently concern modifying polymeric materials, particularly polyethylene, such as by corona discharge and/or flame treatment oxidation. Flame treatment oxidation is a currently preferred method for oxidizing the surface of the composite product. Typically, grafting chemicals are thereafter attached to the oxidized polymeric material for coupling other materials, such as paint or veneers, to the oxidized thermoactive material.

But, there are other methods for oxidizing the surface of composite products made in accordance with the present invention for coupling grafting chemicals to the product's surface. Currently, the three most likely approaches for modifying the surface of composite products are as follows: (1) flame and/or corona discharge oxidation, as discussed above; (2) photoreactions, particularly ultraviolet irradiation in the presence of azido compounds, including but not limited to perfluorophenyl azides; and (3) E-beam treatment of the composite product, perhaps simultaneously with the application of grafting chemicals. One possible approach will be to both crosslink the thermoactive material of the composite product by E-beam (see Example 7) while simultaneously applying surface grafting chemicals to the surface of the product.

V. EXAMPLES

The following examples are provided solely to illustrate certain particular features of the present invention, but the invention should not be limited to the particular features described.

Example 1

This example describes the formation of a 7/16-inch-thick composite product having a density of about 50 pounds/$ft_3$ and comprising about 50% waste polyethylene. Waste thermoplastic material, primarily polyethylene, but perhaps containing minor fractions of other thermoplastic materials, and wood were comminuted into flakes. A mixture was then formed by hand comprising about 115 grams of comminuted thermoplastic material and about 126 grams of wood flakes having a moisture content of about 9.8%. This mixture was then placed in a containment bin for thermal consolidation in a batch hot-air consolidation apparatus that uses the principles of the apparatuses illustrated in FIGS. 3–6, the batch apparatus having only one cell for applying hot air to the entire area of one surface of the mixture in the containment bin. Hot air at a temperature of about 400° F. was applied to the mixture generally at a pressure of less than about 1–2 psig for a period of about 1 minute. The thermally consolidated mixture was removed from the consolidation apparatus and pressed to its final density in a conventional platen press at a pressure of about 550 psig.

Example 2

Composite products made in accordance with the present invention may advantageously be overlaid with a paper sheet or material, a plastic sheet or material, or both. For example, portions of the cellulosic material may extend upwardly from the surface of the board product, which is referred to herein as telegraphing. Overlaying the board product with a paper sheet or material, a plastic sheet or material, or both, solves problems associated with telegraphing. The present example describes the formation of a board product having an overlying layer of a thermoplastic material.

A board product was made as substantially described in Example 1. A 2 millimeter-thick sheet of low density polyethylene was then placed on each major opposing surface of a warm composite product after thermal consolidation. The overlaid product was then pressed for a period of about 2 minutes at about 550 psig in a conventional heated platen press heated to a temperature of about 275°.

Example 3

This example describes the formation of a 7/16-inch-thick three-layer board product having a core between two outer layers comprising filler and thermoplastic fines. A first mixture was made comprising 17 grams of thermoplastic material fines, primarily polyethylene, and 18 grams wood fines having a moisture content of about 11.1%. This mixture was formed into a mat in a containment bin. A second mixture for the product's core was then made comprising about 82 grams thermoplastic material and 102 grams cellulosic wood flakes having a moisture content of about 12.42%. This mixture was formed into a mat on top of the mat situated in the containment bin. Finally, a third layer substantially identical to the first layer was placed on top of the core layer in the containment bin.

Air at a temperature of about 400° F. was applied to the mixture at a pressure of about 1–2 psig for a period of about 1 minute. The thermally consolidated mixture was removed from the consolidation apparatus and pressed to its final density at a pressure of about 550 psig using a conventional platen press.

Example 4

This example describes the formation of a 7/16-inch-thick three-layer board product having a core between two outer layers comprising fines, the board product being overlaid with a plastic layer. A three-layer board product was made substantially as described above in Example 3. A 0.002-inch-thick sheet of low density polyethylene was then placed on each major opposing surface of the board product after thermal consolidation. The overlaid product was then pressed in a conventional platen press at a pressure of about 550 psig and a temperature of about 275° for a period of about 2 minutes.

Example 5

This example describes the formation of a 7/16 inch board having a density of about 50 pounds/$ft^3$ and comprising about 50% polyethylene, the board product being surface modified and painted. A board product was made substantially as described above in Example 1. The surface of the product was subjected to flame treatment to oxidize the surface of the product (products also have been made where the surface of the product was oxidized by corona discharge). A solution, such as an aqueous solution, an organic solution, particularly alcoholic solutions, and most typically an aqueous/organic solution (e.g., water and alcohol) of surface-modifying agents, such as silanes, ketonates, zirconates, amines, chromium compounds, etc., was applied to the product. The surface-modified composite product was then painted and allowed to dry.

The adhesion of the paint to the composite product was then tested using an Elcometer according to ASTM D4541-89 and compared to products that had not been surface modified. These tests showed that non-surface modified painted products fail at the paint-product interface, whereas the surface-modified products exhibited cohesive failure of the product itself, not at the paint-product interface.

Example 6

This example discusses the production of composite products having crosslinked thermoactive materials. Waste thermoplastic material, primarily polyethylene, and wood were comminuted into flakes. A solution (0.5 g/ml in hexanes) comprising various percents of peroxide crosslinking agents, in this example dicumyl peroxide, by weight of the thermoplastic material as indicated below in Table 1 was sprayed onto the thermoplastic material. A mixture was then formed by hand comprising about 115 grams of the comminuted thermoplastic material (after soaking in the crosslinking agent solution) and about 126 grams of wood flakes having a moisture content of about 9.8%. This mixture was then placed in a containment bin for thermal consolidation. Hot air was applied to the mixture at a pressure of about 1–2 psig and a temperature of about 400° F. in the consolidation apparatus for a period of about 1 minute. The thermally consolidated mixture was removed from the consolidation apparatus and pressed to its final density at a pressure of about 550 psig using a conventional platen press.

The creep rate (displacement/time) of the products made according to this example was then determined with respect to the gel fraction of the product, which indicates the percent crosslinking that occurred with the thermoactive material. The gel fraction was determined according to ASTM D2765-95 modified to account for the wood in the composite, where the wood was treated as a filler in the method. For purposes of comparison, the creep rate for a product made without crosslinking the thermoactive material was measured as being $4.76\times10^{-4}$ mm/minute at a load of 50 Newtons. Loads for normal use of the product are expected to be about 0.1 to about 5 Newtons. Composite products made according to the method of the present invention and having crosslinked thermoactive material had substantially reduced creep rates as shown by Table 1.

TABLE 1

| Peroxide Addition | Gel Fraction (% of plastic) | Creep Improvement (%) |
|---|---|---|
| 0 | 0 | — |
| 2 | 33 ± 3 | 84 |
| 6 | 30 ± 4 | 78 |

Example 7

This example further discusses the production of composite products having crosslinked thermoactive materials. Waste thermoplastic material, primarily polyethylene, and wood were comminuted into flakes. A mixture was then formed by hand comprising about 115 grams of comminuted thermoplastic material and about 126 grams of wood flakes having a moisture content of about 9.8%. This mixture was then placed in a containment bin for thermal consolidation. Hot air was applied to the mixture at a pressure of about 1–2 psig and a temperature of about 400° F. in the consolidation apparatus for a period of about 1 minute. The thermally consolidated mixture was removed from the consolidation apparatus and pressed to its final density at a pressure of about 550 psig using a conventional platen press.

The composite product was then subjected to electron-beam (E-beam) treatment to crosslink the thermoplastic material. The E-beam crosslinking was done by E-beam Services of Cranberry, New Jersey, but also could be done by other entities, such as the Atomic Energy Commission Laboratory, Whiteshell, Manitoba, Canada. The product can be subjected to E-beam treatment at any time following thermal consolidation, but typically is best accomplished while the product is still warm. Various E-beam doses in Mrads were tried. The creep rate (displacement/time) of the products made according to this example was then determined with respect to the gel fraction of the product. The gel fraction again was determined according to ASTM D 2765-95 modified to account for the wood in the composite, where the wood was treated as a filler in the method.

The percent decrease in creep relative to a non-crosslinked composite product was determined, as summarized below in Table 2. These results are substantially similar to the results presented for chemically crosslinked substrates. E-beam likely will be a preferred process for commercial production because it can be implemented less expensively than can chemical crosslinking.

TABLE 2

| E-Beam Dose (Mrads) | Gel Fraction (% of plastic) | Creep Improvement (%) |
|---|---|---|
| 0 | 0 | — |
| 6 | 40 ± 4 | 85 |
| 16 | 60 ± 4 | 86 |

The present invention has been described in accordance with preferred embodiments. However, it will be understood that certain substitutions and alterations may be made thereto without departing from the spirit and scope of the invention.

I claim:

1. A composite product comprising cellulosic material and polyethylene material in a ratio of 7:3 to a ratio of 3:7 by volume of cellulose-to-polyethylene, at least one exterior surface of the product being surface modified and having grafting chemicals attached thereto, the grafting chemicals selected from the group consisting of silanes, ketonates, zirconates, amines, chromium compounds, and mixtures thereof.

2. The composite product according to claim 1 wherein the thermoactive material is crosslinked.

3. The product according to claim 2 wherein the product further comprises a surface coating of a thermoactive or paper material.

4. The product according to claim 1 wherein the product further comprises a surface coating of a thermoactive or paper material.

5. A painted product according to claim 1.

6. The product according to claim 1 and further including plural layers.

7. The product according to claim 6 comprising a core layer and one or more exterior layers.

8. The product according to claim 7 where at least one exterior layer comprises cellulosic fines.

9. The product according to claim 1 and including a material selected from the group consisting of biocides, fungicides, fire retardants, conductive materials, pigments, water retardants, wax-like materials, coupling agents, crosslinking agents, and combinations thereof.

10. The product according to claim 1 and having a thickness of about 7/16 inch.

11. The product according to claim 1 and having an embossed surface.

12. The product according to claim 1 and having a smooth surface.

13. The product according to claim 1 and having a painted surface.

14. The product according to claim 1 laminated with at least one veneer facing.

15. The product according to claim 1 overlaid with a paper sheet, a plastic sheet, or both.

16. A composite product, comprising:

a core layer and exterior layers comprising cellulose and polyethylene in a ratio of 7:3 to a ratio of 3:7 by volume of cellulose-to-polyethylene, the surface of at least a portion of an exterior layer being surface modified and having grafting chemicals attached thereto, the grafting chemicals being selected from the group consisting of silanes, ketonates, zirconates, amines, chromium compounds, and mixtures thereof; and an overlay, the overlay comprising a paper sheet, a plastic sheet, or both.

17. The product according to claim 16 where at least one exterior layer comprises cellulosic fines.

18. The product according to claim 16 and having an embossed surface.

19. The product according to claim 16 and having a smooth surface.

20. The product according to claim 16 and having a painted surface.

21. The product according to claim 16 laminated with at least one veneer facing.

* * * * *

UNITED STATES PATENT AND TRADEMARK OFFICE

CERTIFICATE OF CORRECTION

PATENT NO. : 6,200,682 B1
DATED : March 13, 2001
INVENTOR(S) : Dubelsten et al.

It is certified that error appears in the above-identified patent and that said Letters Patent is hereby corrected as shown below:

Column 6,
Line 22, "therinoactive" should be -- thermoactive --.

Column 12,
Line 38, "5,872,190, which" should be -- 5,872,190, respectively, which --.

Column 16,
Line 11, "thermoactive" should be -- polyethylene --.

Signed and Sealed this

Ninth Day of July, 2002

*Attest:*

JAMES E. ROGAN

*Attesting Officer*

*Director of the United States Patent and Trademark Office*